United States Patent [19]

Bryant et al.

[11] Patent Number: 4,672,380

[45] Date of Patent: Jun. 9, 1987

[54] GAIN RESTORATION AFTER DOPPLER FILTERING

[75] Inventors: Stephen M. Bryant, Baltimore; Lanier G. Cole, Crofton, both of Md.

[73] Assignee: The United States of America as represented by the Secretary of the Air Force, Washington, D.C.

[21] Appl. No.: 656,845

[22] Filed: Oct. 2, 1984

[51] Int. Cl.$^4$ .............................................. G01S 7/34
[52] U.S. Cl. ....................................... 342/92; 342/195
[58] Field of Search ................. 343/5 DP, 5 FT, 7 A, 343/7 AG, 5 CE, 5 CF, 5 W; 342/89-93, 195

[56] References Cited

U.S. PATENT DOCUMENTS

| | | | |
|---|---|---|---|
| 3,781,883 | 12/1973 | Effinger et al. | 343/7 A |
| 3,787,849 | 1/1974 | Sletten et al. | 343/7.7 |
| 3,870,997 | 3/1975 | DiPerry | 343/18 E |
| 4,058,809 | 11/1977 | Chudleigh, Jr. | 343/7 A |
| 4,213,129 | 7/1980 | Kennedy et al. | 343/6.8 R |
| 4,228,435 | 10/1980 | Nevin | 343/7 A |
| 4,377,811 | 3/1983 | Mooney, Jr. et al. | 343/7 A |
| 4,435,707 | 3/1984 | Clark | 343/5 W |

Primary Examiner—Thomas H. Tarcza
Assistant Examiner—Bernarr Earl Gregory
Attorney, Agent, or Firm—William G. Auton; Donald J. Singer

[57] ABSTRACT

In a pulse doppler radar system which provides dynamic correction to variable radar echo return signals from clutter end targets using a block adaptive signal regulator (BASR) and a fast Fourier transform (FFT), a gain restoration circuit is used to optimize the gain corrected amplitudes over a plurality of time samples so that the tendancy of larger targets to obscure the return signals of smaller targets is minimized. The BASR conventionally evaluates the amplitude of echo returns in each time sample before it enters the FFT, by determining if they exceed the radar receiver's dynamic range, and dividing all samples by $2^N$ when a sample exceeds the dynamic range (where N equals a shift number which signifies a shift by the BASR). The gain restoration circuit feeds information which indicates the number of BASR shifts to the output of the FFT as a function of range gate. This enables an evaluation to be made of all time samples in a range gate before they enter the FFT so that the largest sample is within the receiver's dynamic range, but the tendency to obscure smaller targets is reduced.

7 Claims, 4 Drawing Figures 4,672,380

GAIN RESTORATION AFTER DOPPLER FILTERING

STATEMENT OF GOVERNMENT INTEREST

The invention described herein may be manufactured and used by or for the Government for governmental purposes without the payment of any royalty thereon.

BACKGROUND OF THE INVENTION

The present invention relates generally to pulse doppler radar systems and specifically to an automatic gain control (AGC) correction circuit providing dynamic gain restoration based upon variable returns from clutter and targets for an airborne early warning radar.

With the rapid advance in the development of weapons delivery systems, the early detection of airborne targets is increasingly critical to a successful defense. Most pulse doppler radars have some form of fast automatic gain control (FAGC) to control the amplitude of signals entering the doppler filters. This FAGC acts independently on each range gate. A large target can reduce the gain through the FAGC and reduce the amplitude of smaller targets at different frequencies and drop them below the detection threshold (this assumes that the reference for the threshold is derived from other range gates). This process can result in a loss of detectability on small targets in the presence of large targets.

A particular pulse doppler radar mechanization, uses a digital FAGC. This mechanization uses a technique known as BASR (block adaptive signal regulation) for the FAGC function. This technique evaluates all of the time samples in a range gate before they enter the FFT. If a sample exceeds the dynamic range of the FFT, all samples are divided by $2^N$ (where N is the number of BASR shifts) until the largest sample is within the dynamic range. This result in attenuation of that range gate by 6, 12, 18, 24, etc. dB depending on N.

The task of preventing the loss of detectability of small targets in the presence of large targets have been alleviated, to some degree by the following U.S. patents:

U.S. Pat. No. 3,787,849 issued to Sletten et al on 22 Jan. 1974;

U.S. Pat. No. 3,870,997 issued to Diperry on 11 Mar. 1975;

U.S. Pat. No. 4,058,809 issued to Chudleigh on 15 Nov. 1977;

U.S. Pat. No. 4,213,129 issued to Kennedy et al on 15 July 1980; and

U.S. Pat. No. 4,377,811 issued to Mooney, Jr. et al on 22 Mar. 1983.

The patent of Sletten et al discloses an airborne radar with a digital moving target detector which reduces the masking effect of ground clutter. The received signals are summed in N groups with each group including samples corresponding to range bins. Included is the use of an FFT algorithm and moving range gates behind doppler filters.

Cludleigh, Jr. disloses a doppler radar which prevents false target indication without inhibiting the display of moving targets in the main beam at the same range but having different doppler frequencies. The gain of a wide band return signal amplifier is separately adjusted for each range bin on the basis of the sampled amplitude of the return signal from the preceding radar pulse. In the patented device the gain is digitally controlled.

The patents of Sletten et al and Chudleigh, Jr. are instructive in the use of atuomatic gain control circuits in airborne early warning radar systems and are hereby incorporated by reference. However both the above references are directed towards the prevention of generation of false targets by ground clutter or terrain echo returns and the embodiment of those inventions are unsuited for the present need.

Mooney, Jr. et al disclose a pulse doppler radar having ground moving target rejection capabilities which is also unsuited for the present need.

Kennedy et al and Diperry both disclose the use of automatic gain control correcion circuits in pulse doppler radar systems and are hereby incorporated by reference. However, Kennedy et al discuss the adverse effects of a slow AGC and Diperry discloses a radar counter-countermeasure system operating with AGC and are unsuited for the present need.

Other prior art systems have used somewhat similar techniques for equalizing gain in the radar system. The known techniques have equalized gain over frequency to correct for the frequency dependent attenuation characteristics of the clutter filter. This type of gain compensation function is constant over time.

In view of the foregoing discussion it is apparent that there currently exists the need for a method of providing dynamic correction based on variable returns from clutter and targets which decreases the chances of returns from large targets from obscuring the returns of smaller targets. The present invention is directed towards satisfying that need.

SUMMARY OF THE INVENTION

The invention is directed to an automatic gain control (AGC) correction circuit useable in a pulse doppler radar receiver. It embodies dynamic correction based on variable returns from clutter and targets. The radar uses a digital fast automatic gain control (FAGC) with a technique known as block adaptive signal regulation (BASR). This technique entails the use of a block adaptive signal regulator 8 which receives radar echo return signals from a radar receiver, and which evaluates all the time samples in a range gate before they enter the fast Fourier transform (FFT) circuit. The invention of this disclosure feeds the information regarding the number of BASR shifts, N, forward to the output of the FFT as a function of range gate. In this way the gain-corrected amplitudes are available for target centroiding. The concept of dynamic FAGC correction based upon the amplitude of clutter and target returns avoids the problems encountered when the system is used in an urban area or with a narrow clutter notch filter.

In the past such operation has resulted in a loss detectability on small targets in the presence of large targets. By applying dynamic correction based upon variable returns from clutter and targets, the tendencies of loss of detectability on small targets is reduced and the probability of detection is increased.

The present invention applies dynamic correction based upon variable returns from clutter and targets. The invention described herein feeds the information regarding the number of BASR shifts, N, forward to the output of the FFT as a function of range gate. If N is 1 or greater (i.e. if a BASR shift has occurred), the output of the FFT is multiplied by two and the number of BASR shifts associated with each detection is (N-1).

The number of BASR shifts is fed-forward so that gain-corrected amplitudes are available for target centroiding. In principle, the output of the FFT could be multiplied by $2^N$ in each range gate in which N BASR shifts has occurred.

It is a principal object of the invention to provide a new and improved automatic gain control for an airborne early warning solar system.

It is another object of the invention to use dynamic correction of radar return signals based upon variable returns from targets and clutter.

It is another object of the invention to reduce the loss of detection of small targets in the presence of large targets.

It is another object of the invention to increase the performance of the probability of detection in an airborne early warning radar system.

These together with other objects, features and advantages of the invention will become more readily apparent from the following detailed description when taken in conjunction with the accompanying drawing wherein like elements are given like reference numerals throughout.

DETAILED DESCRIPTION OF THE PREFERRED EMBODIMENT

This invention is directed to an automatic gain control correction circuit usable in a pulse doppler radar receiver. It embodies dynamic correction based upon variable returns from clutter and targets.

Figure 1:
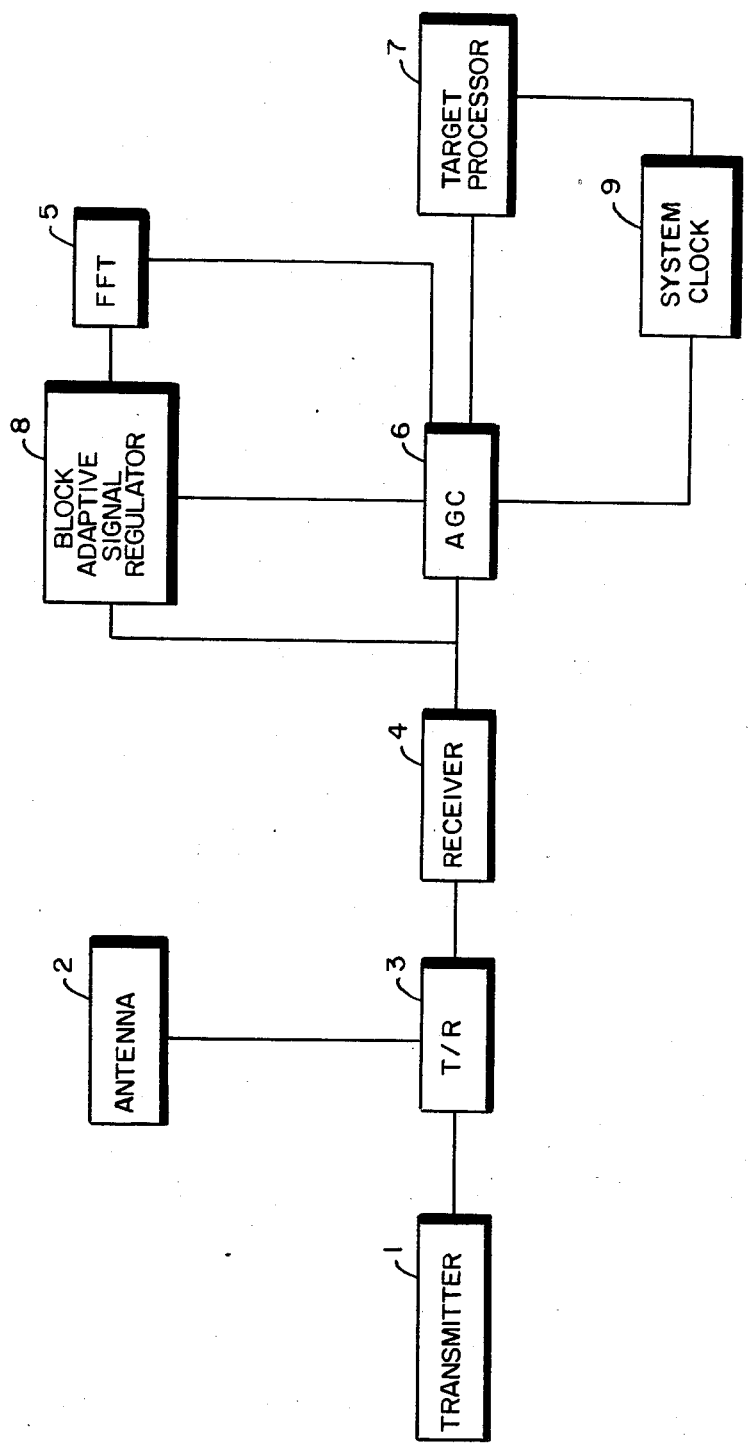
FIG. 1 is a block diagram of a prior art pulse doppler radar system.

Referring now to the prior art pulse doppler radar system illustrated in the schematic block diagram of FIG. 1, energy from the transmitter 1 is fed to the antenna 2 through the conventional transmit-receive or T-R switch to the radar receiver 4 in a conventional manner.

The output signal from the radar receiver is fed through a convention fast Fourier transform (FFT) 5 and an automatic gain control (AGC) circuit 6 which applies a selective gain to target returns before they enter the target processor.

The radar system in FIG. 1 uses a digital fast automatic gain control (FAGC) with a technique known as block adaptive signal regulation (BASR). This technique entails the use of a block adaptive signal regulator 8 which receives radar echo return signals from the radar receiver 4, and which evaluates all the time samples in a range gate before they enter the fast Fourier transform (FFT) circuit. A detailed description of an application of a block adaptive signal regulator is included in technical manual T.O. 1E-3A-43-2-93-1-6, produced by the Westinghouse Electric Corporation on June 1, 1981. In this application the BASR system was used in the E3A airborne radar system for the AWACS program. The invention of this disclosure feeds the information regarding the number of BASR shifts, N, forward to the output of the FFT as a function of range gate. In this way the gain-corrected amplitudes are available for target centroiding. The block adaptive signal regulator 6 is therefore shown between the radar receiver and the FFT 5. Also, a system clock 9 provides timing to both the target processor 7 and the AGC 6.

The radar system of FIG. 1 like most pulse doppler radars has a form of fast automatic gain control (FAGC) to control the amplitude of signals entering the doppler filters. This FAGC acts independently on each range gate. A large target can reduce the gain through the FAGC and reduce the amplitude of smaller targets at different frequencies and drop them below the detection threshold (this assumes that the reference for the threshold is derived from other range gates). This process can result in a loss of detectability on small targets in the presence of large targets.

Figure 2:
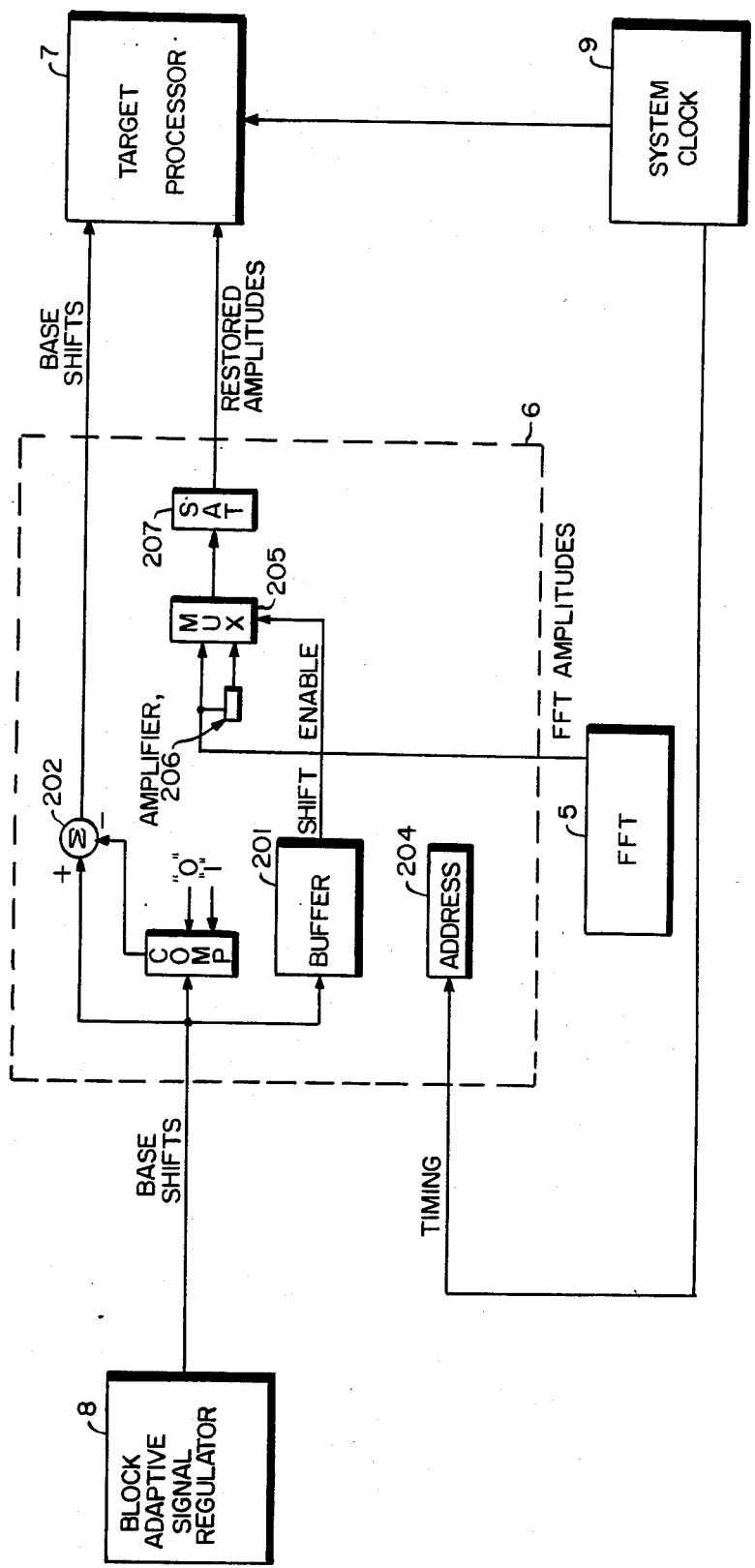
FIG. 2 is a block diagram of the gain restoration circuit that is used for automatic gain control with the radar system of FIG. 1.

FIG. 2 is a block diagram of the gain restoration circuit that is used for the automatic gain control 6 in the radar system depicted in FIG. 1. In other words, FIG. 2 depicts only a fragmentary portion of FIG. 1, so the omitted elements of FIG. 1 can be assumed to exist. For example, the BASR 8 of FIG. 2 is the same as the BASR of FIG. 1, and it receives radar echo return signals from the radar receiver 4 of FIG. 1. The gain restoration circuit 60 provides dynamic correction based upon variable returns from clutter and targets using a BASR shift buffer 201, a summing junction 202, a computer 203, a block address unit 204, a multiplexer 205, an amplifier 206 and a signal saturation detection unit 207.

The gain restoration circuit 60 shown in FIG. 2 feeds the information regarding the number of BASR shifts, N, forward to the output of the FFT as a function of range gate. If N is 1 or greater (i.e. if a BASR shift has occurred), the output of the FFT is multiplied by two and the number of BASR shifts associated with each detection is (N-1). The number of BASR shifts is fed-forward so that gain-corrected amplitudes are available for target centroiding. In principle, the output of the FFT could be multiplied by $2^N$ in each range gate in which N BASR shifts has occurred.

The gain restoration circuit 60 serves to provide a buffer for the BASR shifts for each range gate, and makes a determination over two date blocks in the subject range gate is to be restored or not.

The BASR shift buffer 201 receives the number of BASR shifts from the block adaptive signal regulator 8 and a signal from the block address unit 204 which notifies it of the event of each new range gate and data block. The BASR shift buffer 201 stores and transfers a number signal which indicates the number of BASR shifts occurring in a range gate or data block.

The computer 203 also receives the number of BASR shifts from the block adaptive signal regulator 8 and outputs to summing junction 202 a logic "1" if a BASR shift is detected in a range gate or in a data block, which indicates that gain restoration should occur. The computer 203 outputs a logic "0" otherwise to the summing junction 202.

The summing junction 202 receives the number of BASR shifts from the block adaptive signal regulator 8, and subtracts the output signal of the computer 203. By receiving and subtracting the computer 203 output signal, the summing junction effectively decrements the BASR shift number by 1 if a BASR shift is detected in a range gate, and transfers a decremented BASR shift number to the target processor 7.

The block address unit 204 receives a block timing signal form the system clock 9 and informs the buffer 201 of each new range gate and data block.

As processed range gates leave the FFTs, the BASR shift buffer 201 is accessed to determine if a BASR shift occurred in either of the data blocks relevant to the current look for each range gate. If a BASR shift is detected, the range gate amplitude for each of the 128 doppler filters of that range gate is multiplied by two (left logical shift). This restores the gain from the effects of a single BASR shift. A test is made for signal saturation after the multiplication by two. If the saturation is detected, the amplitude value is replaced by the maximum amplitude representation.

Multiplexer 205 and amplifier 206 receive the FFT amplitudes when, as mentioned above, processed range gates leave the FFTs. This multiplexer accesses the BASR shift buffer 201 to determine if a BASR shift occurred in either of the data blocks relevant to the current look for each range gate. Amplifer 206 multiplies the range gate amplitude from the FFT by two if a BASR shift is detected, and sends the multiplied amplitude signal back to the multiplexer 205.

The signal saturation detection unit 207 receives and tests the multiplied amplitude signal from multiplexer 205. If saturation is detected, the amplitude value is replaced by the maximum amplitude representation and the restored amplitude is sent to the target processor 7.

Figure 3:
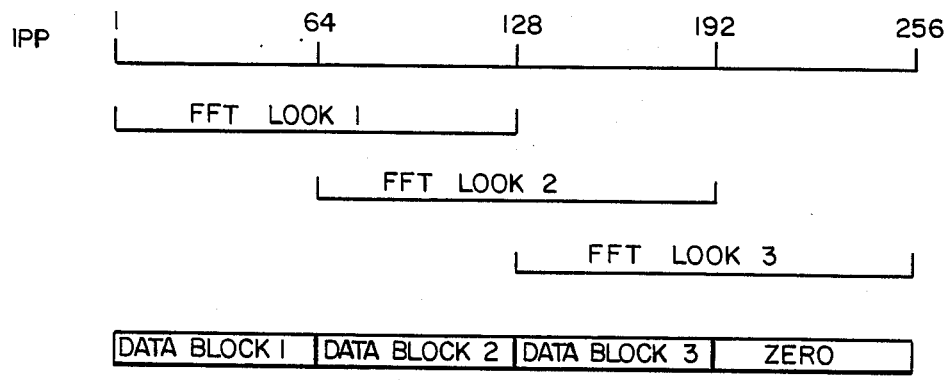
FIG. 3 is a timing diagram for a three look interval.

The block adaptive signal regulator for the particular pulse doppler radar under consideration operates on blocks of 64 time samples at a time. Two such samples are concatentated for forming a 128 time sample input for the FFT. A timing diagram for a three look interval is shown in FIG. 3. Since BASR shifts are generated on a 64 block of times samples, a range gate at the output of the FFT that has received a BASR shift, may have received that shift as a result of a signal amplitude in data block 1, data block 2 or both. The gain restoration circuit must provide a buffer for the BASR shifts for each range gate and make a determination over two data blocks if the subject range gate is to be restored or not.

Figure 4:
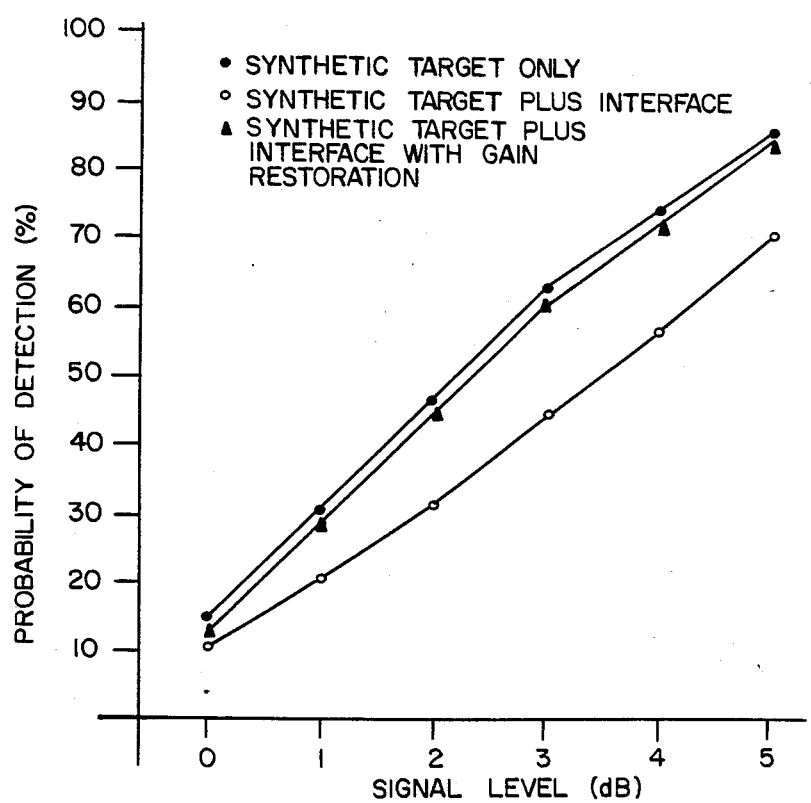
FIG. 4 is a chart comparing radar system performance in target detection between simulation, performance without using the invention and radar performance using the invention.

This invention has been flown in an urban area and shows some improvement in performance. In a controlled test, probability of detection was measured on a synthetic target as a function of signal level. A source of interference, pseudo-randomly positioned in range, which induced one BASR shift in an average of seven range gates was injected along with the target and the probability of detection measured. Finally, this measurement was repeated utilizing the gain restoration invention. The results are plotted in FIG. 4. It can be seen that the BASR shifts degraded performance by about 1.3 dB and $P_D = 50$ percent and the gain restoration restored all but about 0.1 dB of this loss.

While the invention has been described in its presently preferred embodiment it is understood that the words which have been used are words of description rather than words of limitation and that changes within the purview of the appended claims may be made without departing from the scope and spirit of the invention in its broader aspects.

What is claimed is:

1. In a pulsed doppler radar system having a block adaptive signal regulator evaluating radar echo return signals in each range gate before they enter a fast Fourier transform by determining if each of said samples exceeds a dynamic range of said radar system, said block adaptive signal regulator producing an output signal by dividing all samples by $2^N$, when a sample exceeds said dynamic range, where N equals a shift number which signifies a register shift by said block adaptive signal regulator, said fast Fourier transform producing an FFT amplitude signal for a target processor which also receives a block timing signal from a system clock, a gain restoration circuit receiving said FFT amplitude signal from said fast Fourier transform and providing gain corrected amplitudes for said target processor; said gain restoration circuit comprising:

a block address unit receiving said block timing signal from said system clock and outputting to said gain restoration circuit a timing signal, said timing signal indicating a beginning of each new range gate and data block;

shift number correction means receiving said shift number from said block adaptive signal regulator, said shift number correction means receiving said timing signal from said block address unit, said shift number correction means producing a corrected shift number by decrementing said shift number by 1 when said shift is detected in a range gate and in a data block, said shift number correction means decrementing said shift number by 0 otherwise, said shift number correction means producing a shift enable signal when said shift by said block adaptive signal regulator occurred in said data block and range gate; and a restored amplitude means receiving said FFT amplitude signal from said fast Fourier transform and said shift enable signal from said shift number correction means, said restored amplitude means producing an output signal by multiplying said FFT amplitude signal by two when a shift is reported by said shift number correction means.

2. A gain restoration circuit as defined in claim 1 including a saturation test means receiving and testing for saturation said output signal from said restored amplitude means, said saturation test means producing and sending to said target processor a restored amplitude signal equaling a maximum amplitude of said FFT amplitude when saturation is detected in said output signal from said restored amplitude means, said restored amplitude signal equaling said output signal from said restored amplitude means when saturation is not detected.

3. A gain restoration circuit as defined in claim 2 wherein said shift number correction means comprises:

a buffer receiving said timing signal from said block address unit and said shift number from said block adaptive signal regulator and producing said shift enable signal;

a computer means being electrically connected in parallel with said buffer with said block adaptive signal regulator, said computer means receiving said shift number from said block adaptive shift regulator and producing an output signal, said output signal equaling a logic "1" when a block adaptive signal regulator has a shift, said output signal from said computer means equalling a logic "0" otherwise; and a summing junction producing said corrected shift number by receiving said shift number from said block adaptive signal regulator and subtracting therefrom said output signal from said computer means.

4. A gain restoration circuit as defined in claim 3 wherein said restored amplitude means comprises:
   an amplifier means receiving and multiplying by two said FFT amplitude signal from said fast Fourier transform and producing a doubled amplitude signal; and
   a multiplexer receiving said FFT amplitude signal from said fast Fourier transform, said doubled amplitude signal from said amplifier means and said shift enable signal from said buffer, said multiplexer producing said doubled amplitude signal as an output signal when a shift is reported by said shift number correction means and said FFT amplitude signal, said multiplexer sending said output signal to said saturation test means.

5. A process of providing dynamic gain restoration to fast Fourier transform amplitude signals representing radar target echo return signals comprising the steps of:
   evaluating radar echo return signals on each range gate before they enter fast Fourier transform by a block adaptive signal regulator and producing a shift number equalling the number of shifts experienced by said block adaptive signal regulator;
   producing an amplitude signal representing a fast Fourier transform value of said radar target echo return; and
   developing an amplified amplitude signal by providing selective gain to said amplitude signals when a shift occurs in said block adaptive signal regulator, and
   sending said amplified amplitude signal to a target processor.

6. A process as defined in claim 5 wherein said developing step comprises the steps of:
   decrementing said shift number by 1 when a shift is detected in a range gate and data block, and decrementing said shift number by 0 otherwise, and sending the resultant value to said target processor simultaneously with said decrementing step, sending to said target processor said amplified amplitude signal equalling said amplitude signal multiplied by two when a shift occurs in said block adaptive signal regulator.

7. A process as defined in claim 6 including a saturation check occuring after said sending step, said saturation check step comprising:
   sending to said target processor said amplified amplitude signal when signal saturation does not occur in said amplified amplitude signal; and
   sending to said target processor an output equaling the maximum amplitude of said amplitude signal when signal saturation is detected in said amplified amplitude signal.

* * * * *